United States Patent [19]
Zolkower et al.

[11] Patent Number: 5,511,741
[45] Date of Patent: Apr. 30, 1996

[54] WEB CLAMPING RETRACTOR MECHANISM WITH SWINGING HOUSING

[75] Inventors: Jeffry N. Zolkower, Southfield; Rudy V. Thomas, Sterling Heights, both of Mich.

[73] Assignee: AlliedSignal Inc., Morristown, N.J.

[21] Appl. No.: 315,645

[22] Filed: Sep. 30, 1994

[51] Int. Cl.$^6$ .......................... B60R 22/405; B60R 22/42
[52] U.S. Cl. ............................................................ 242/381.1
[58] Field of Search ............................. 242/381.1, 381.4, 242/383.2, 384.5; 297/478, 480; 280/806

[56] References Cited

U.S. PATENT DOCUMENTS

| | | | |
|---|---|---|---|
| 4,394,034 | 7/1983 | Murphy | 242/381.4 X |
| 4,437,623 | 3/1984 | Wyder. | |
| 4,492,348 | 1/1985 | Ziv et al. | 242/381.1 |
| 4,687,253 | 8/1987 | Ernst et al. | 297/478 |
| 4,899,949 | 2/1990 | Meyer et al. | 242/381.1 |
| 4,938,431 | 7/1990 | Smithson. | |
| 4,949,995 | 8/1990 | Haland et al. | 242/381.4 X |
| 5,024,391 | 6/1991 | Zygutis et al. | 242/381.1 |
| 5,242,213 | 9/1993 | Fohl | 242/381.1 X |

*Primary Examiner*—John M. Jillions
*Attorney, Agent, or Firm*—Markell Seitzmann

[57] ABSTRACT

A retraction mechanism comprising: a winding housing having a wedge pusher member; a spool rotationally supported in the winding housing having webbing wound thereon; a rewind spring for rewinding webbing onto the spool; a sensor responsive to one of vehicle deceleration or web acceleration in excess of a determinable limit for pre-blocking the rotation of the spool prior to the initiation of web clamping; a support frame for rotationally supporting the winding housing, and a web clamping device supported in the support frame, in a deactivated condition, for clamping the webbing, wherein after the pre-blocking of the spool and in response to a continued force on the web the winding housing rotates urging the web pusher into engagement with the web clamping device to clamp the web therebetween.

7 Claims, 2 Drawing Sheets

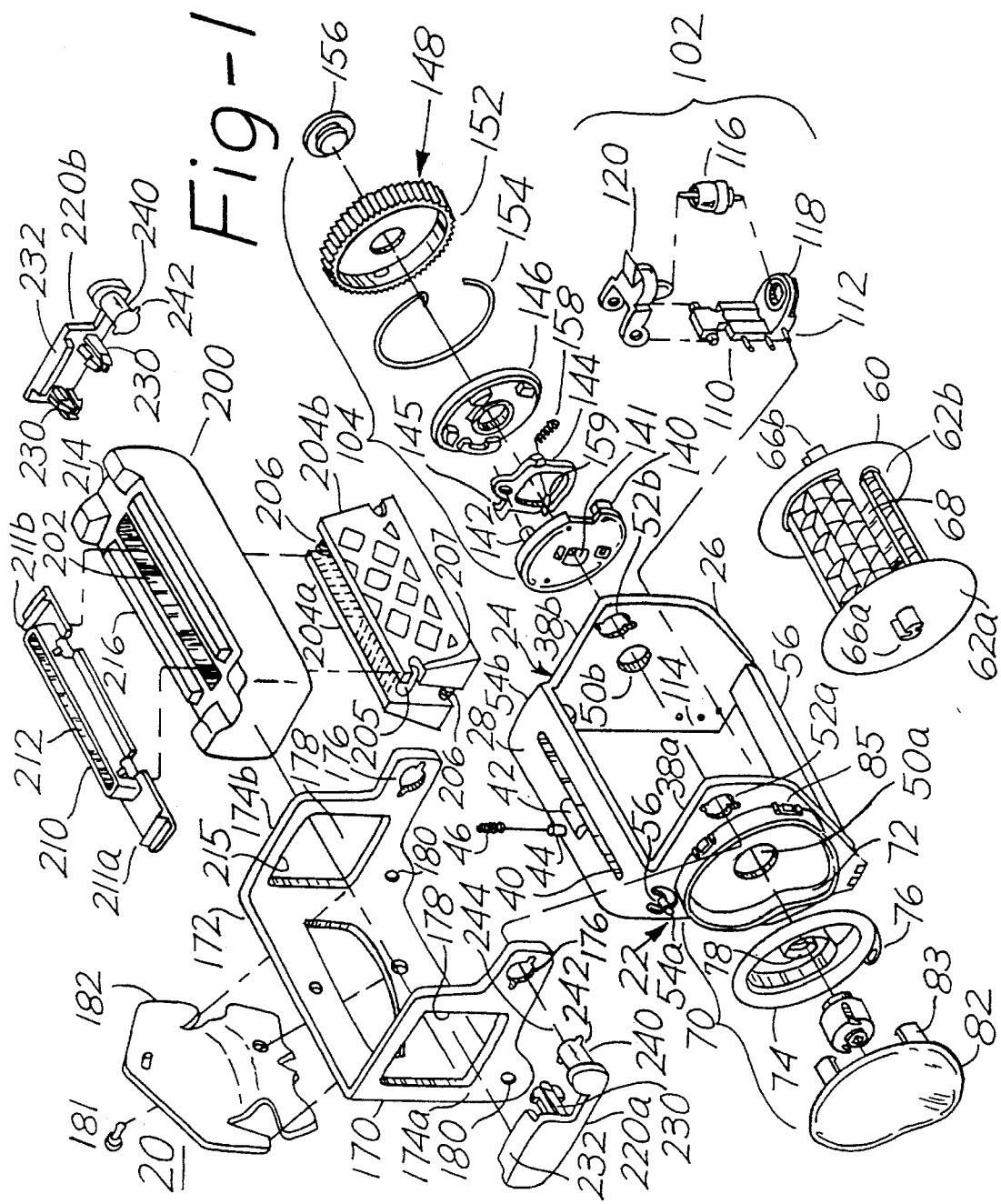

WEB CLAMPING RETRACTOR MECHANISM WITH SWINGING HOUSING

BACKGROUND AND SUMMARY OF THE INVENTION

The present invention relates to seat belt retractors generally and more particularly to a web locking mechanism, U.S. Pat. Nos. 4,437,623 and 4,687,253 are illustrative of prior art web locking retractors. It is an object of the present invention to provide an improved web locking mechanism.

According the invention comprises: a retraction mechanism comprising: a winding housing having a wedge pusher member rotation supported in a support frame; a spool rotationally supported in the winding housing with webbing wound thereabout; a rewind spring for rewinding webbing onto the spool; sensor means responsive to one of vehicle deceleration or web acceleration in excess of a determinable limit for pre-blocking the rotation of the spool prior to the initiation of web clamping; support frame means for rotationally supporting the winding housing and for holding web clamping means, in a deactivated condition and for subsequently clamping the webbing, wherein movement of the winding housing after the spool if blocked any continued force on the web causes the winding housing to rotate urging the web pusher into engagement with the web clamping means to clamp the web therebetween.

Many other objects and purposes of the invention will be clear from the following detailed description of the drawings.

BRIEF DESCRIPTION OF THE DRAWINGS

In the drawings:

FIG. 1 shows an assembly view of many components of the present invention.

DETAILED DESCRIPTION OF THE DRAWINGS

Figure 2:
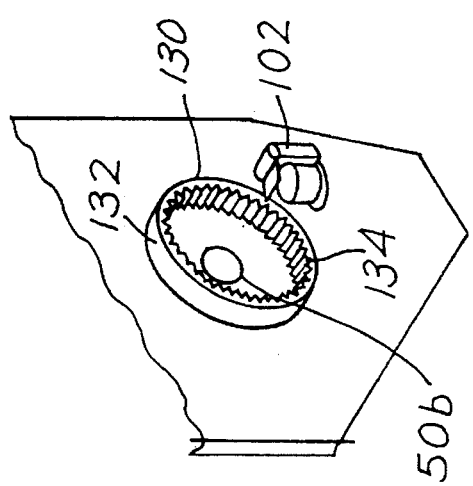
FIG. 2 shows a partial projected view of a winding housing of the present invention.

FIGS. 1 and 2 show a web locking retraction mechanism 20 including a fixed reel or spool retractor member 22 generally comprising a winding housing 24, a spool or reel 60, return spring 74, and vehicle and web sensors 102 and 104. The winding housing 24 includes a U-shaped frame 26 having a top 28 and two sides 38a,b depending downward therefrom. The top 28 includes a web receiving slot 40, a wedge pusher 42 and a boss 44 for supporting a reaction spring 46. The sides of the frame include a plurality of openings such as axle openings 50a,b and a pair of keyed openings 52a,b. The lower ends 54 of each frame side are spaced by a spacer 56. Extending from the sides 38a,b are respective stop pins 54a,b. Only pin 54a is visible in FIG. 1. The pins are supported on a deformable part 56 of the frame so that the pins can be moved inwardly during assembly of the invention and located in openings 180.

The spool 60 is rotationally supported in the winding housing 24 within the openings 50a,b which serve as bearings. Additional bearings or bushings can be used within the opening 50a,b or adjacent thereto to support the spool 60. The spool 60 includes two side flanges 62a,b, a slotted center member 64 and two stub axles 66a,b extending outwardly from the flanges. Seat belt webbing 69 (see FIG. 4) extends out from a slot 68 in the member 64, in a known manner and is wound thereabout. The spool 60 is positioned in the frame 24 with the stub axles extending through the openings 50a,b.

Situated on the left hand frame side 38a is a spring assembly 70. The spring assembly 70 includes spring housing 72, and a return spring 74, fitted in the spring housing 72. The outer end 76 of the return spring is fixed relative to the spring housing 72 and the inner end 78 is secured to a spring arbor 80 which is secured to the right hand stub axle 66a to rotate the spool 60. A spring cover 82 having tabs 83 snaps to tabs 85 on the spring housing to protect the spring.

Located on the right hand frame side is a sensor assembly comprising a vehicle sensor 102 and a web sensor 104. The vehicle sensor 102 includes a support member 110 having a plurality of locating and mounting pins 112 which are received into mounting openings 114 in the frame. The support member 112 includes a sensing mass 116 such as a standing man, tiltably supported on a ledge 118 member of the support member in a known manner. The vehicle sensor 102 additionally includes a sensing pawl 120 rotatably mounted to the support member 110. The web sensor 102 described below is typical of some used in prior retractors and includes a lock ring 130 (see FIG. 2) positioned about opening 50b and secured to side 30b having a circular wall 132 with internal teeth 134. The web sensor 104 includes a first member 140 secured to stub axle 66b and rotatable therewith. The stub axel 66b has a square profile received in a square opening 141 of the first member 140. The first member 140 includes a pin 142 on which a sensor pawl member 144 rotates. The sensor pawl member includes at least one locking tooth 145. The web sensor additionally includes a clutch member comprising a sensor inertia member or mass 146, a cup shaped ratchet wheel member 148 having external teeth 152 and a retaining spring 154 which holds the sensor inertia member 146. The ratchet wheel member 148 is held to the first member 142 by a pin 156. The sensor pawl member 144 includes a bias spring 158. One side of the spring 158 is received on a boss 159 on member 144 while the other side is secured on the first member 141. The spring biases the pawl member 144 away from engagement with the teeth 134. The inertial mass 146 is received in a cavity of a ratchet wheel 148. The inertia wheel is secured to and rotatable relative to the ratchet wheel by the spring 154.

The retractor mechanism 20 additionally includes a U-shaped support frame 170 having a rear member 172 and two frame sides 174a,b extending therefrom. Each frame side includes a keyed opening 176 and a generally oversized rectangular wedge guide housing opening 178. Each side further includes an oblong or oversized opening 180 the purpose of which is detailed below to receive stop pin 54a,b which acts cooperatively as a stop and rotation limit for the winding housing 24 once installed into the frame 170. Attached to the support frame 170, by rivets 181 or the like is a mounting frame 182 which is used to mount the frame 170 and retractor 22 to a mounting surface in the vehicle (not shown).

Figure 3:
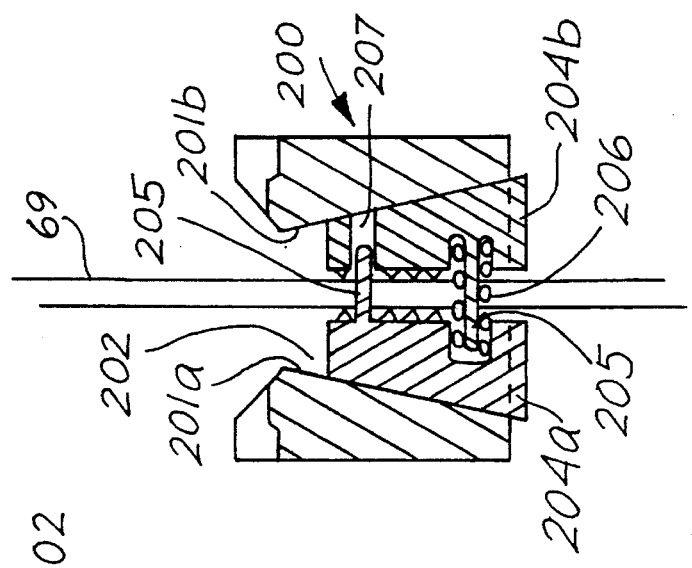
FIG. 3 is a cross sectional view through a wedge guide.

A wedge guide housing 200 is received in the support frame 170 at the upper part of the openings 178. The wedge housing 200 is generally shaped as a rectangular prism having a trapezoidal space 202 formed therein formed by sloped wall 201a,b as can be seen in FIGS. 1 and 3. Slidably received in the wedge guide 200 are a plurality of movable wedges 204a,b biased apart by springs 206 received on guide pins 205. Additional guide pins 205 are received in openings 207 of the wedges. A similar and substitute wedge guide and wedges are also shown in U.S. Pat. No. 4,938,431 which is incorporated herein by reference.

Positioned atop of the wedge guide housing 200 is a web guide 210 having end bosses 211a,b and a slot 212 to receive the webbing 69. As can be appreciated the webbing 69 extends from the spool 60 and is threaded through the space 202 between the wedges and through the slot 212. The web guide is positioned in a depression 214 on the top 216 of the wedge housing 200. When in place on the frame 170 the web guide 210 is sandwiched between the wedge housing 200 and a surface 215 at the top of the opening 178. When in place the bosses 211 engage the sides of the frame 170 keeping it in place. The wedge guide housing 200 is smaller (top-bottom) than the openings 178. The wedge guide is maintained vertically in place by two locating members 220a,b which are received in opposing opening 178. The locating members are placed at the lower surface of each opening 178. Each locating member includes two snap tabs 230 which retains the wedge guide housing to the frame 170 and a ledge 232 on which the housing 200 rests. The means of keeping the housing 200 in the frame is not important to the invention and other means may be substituted. Each locating member 220a,b includes an integrally shaped pin 240 having a key 242. The key 242 extends into the keyed openings 176 and 52a,b in the support frame and winding housing 24 and provides a pivot axis 244 for the winding housing 24.

During assembly the winding housing 24 is rotated 90 degrees as seen in FIG. 1 so that the key of openings 52a,b are in line with the keys of openings 176. Thereafter the pins 240 are inserted into the aligned openings. Subsequently, the winding housing 24 is rotated to the position shown in FIG. 1 and the stop pins 54a,b moved inward to avoid the frame and placed in openings 180. As can be appreciated the pins 54 and openings 174 prevent excessive counter clockwise rotation of the winding housing 24.

Figure 4:
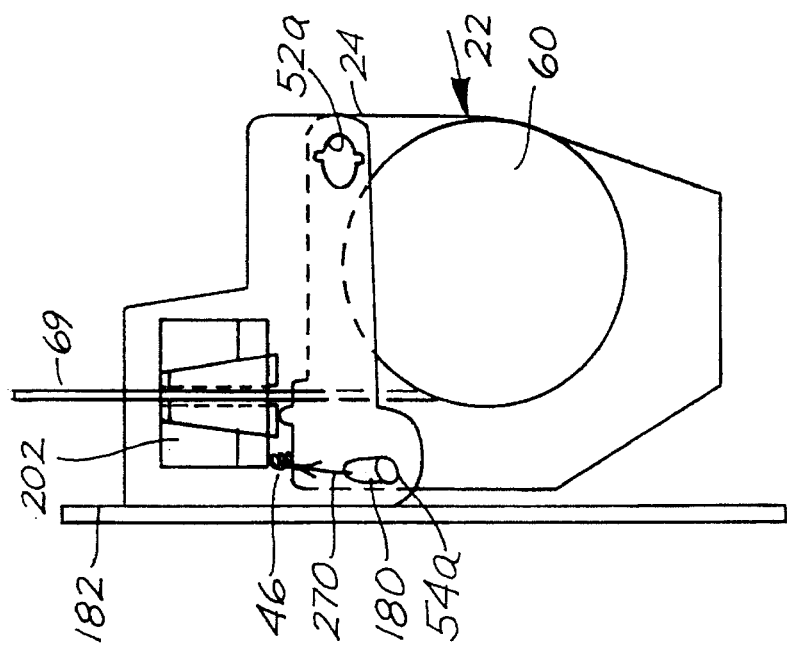
FIG. 4 is a side view of the present invention.

Reference is made to FIG. 4 in which the locating members 220 have been removed for clarity. During normal operation of the retractor mechanism 20 neither the vehicle sensor 102 nor the web sensor 104 are activated and the spool is free to rotate under the influence of the return spring 74 as the webbing 69 is extracted and retracted. When the vehicle is decelerated at a level typically at or about 0.45–0.7 g the sensor mass 116 of the vehicle sensor 102 tips upon its support 118 and lifts the rotary sensor pawl 120 into mating contact with the teeth 152 of the ratchet wheel 148 of the web sensor 104. With the ratchet wheel held fixed by the sensor pawl 120 and the first member 144 rotated (as it is fixed to and moves with the spool) the inertia mass 146 moves relative to the first member 140 and in so doing moves the sensor pawl 144 of the web sensor 104 about pin 142 into engagement with the teeth 134 of the lock ring 130 secured to the frame side 30a blocking further rotation of the spool 60. In addition, a rapid rotation of the spool at a level in access of a second limit value such as 1.5–3.0 g causes a momentary lag between the first member 140 and the inertia member 146 again causing the web sensor pawl to rotate about pin 142 and engage the teeth 134 on the lock ring 130 stopping the spool. At this moment the actuated sensor, i.e. the vehicle sensor or the web sensor absorbs the crash forces imparted via the webbing and spool 60. As can be seen in response to either an excessive vehicle deceleration or the excessive rotation of the spool which results from the excessively fast protraction of the webbing the web sensor pawl is locked against the housing thereby pre blocking, that is, stopping the reel 60 and preventing the further protraction of webbing. With the reel blocked any continued force on the web 69 will be absorbed by the reel (spool 60). In response to this force, the winding housing 24 rotates about the pivot pins 240. As the winding housing 24 rotates the wedge pusher 42 is moved upwardly as indicated by the arrow 270, compressing the spring 46. The wedge pusher engages the underside of the one of the wedges 204 pushing the wedges upwardly into the wedge guide 200. The internal sloped walls 201 of the wedge guide causes the spacing between the wedges to lessen as the wedges are pulled upward by the web, clamping the web therebetween.

When the load on the web is removed the winding housing is returned to its normal position by the bias force of spring 46. The wedges release as a result of the biasing force of spring 46 and retractive force on the webbing resulting from the rewind spring 74.

Many changes and modifications in the above described embodiment of the invention can, of course, be carried out without departing from the scope thereof. Accordingly, that scope is intended to be limited only by the scope of the appended claims.

We claim:

1. A retraction mechanism comprising:

a winding housing having a wedge pusher member;

a spool having an axis of rotation fixedly supported within the winding housing, the spool rotationally supported in the winding housing having webbing wound thereon;

a rewind spring for rewinding the webbing onto the spool;

sensor means responsive to one of vehicle deceleration or web acceleration in excess of a determinable limit for pre-blocking the rotation of the spool prior to the initiation of web clamping;

support frame means for rotationally supporting the winding housing, web clamping means supported in the support frame means, in a deactivated condition, for clamping the webbing when activated, wherein after the pre-blocking of the spool and in response to a continued force on the web the winding housing rotates against a bias force of a bias spring located between the winding housing and the support frame means urging the web pusher member into engagement with the web clamping means to clamp the web therebetween.

2. The device as defined in claim 1 wherein the support frame means includes a frame having opposingly located wedge guide openings within opposing frame sides within which a wedge guide of the web clamping means is received, the wedge guide supporting at least one movable wedge of the web clamping means, wherein the wedge guide is secured within respective wedge guide openings of the frame sides by a pair of locating members, each one of the pair of locating members received within a respective wedge guide opening and wherein each locating member includes a pivot means, received with a respective pivot opening in a forward part of the support means, for rotationally supporting the winding housing.

3. The device as defined in claim 2 wherein the winding housing includes a three sided case having a top and two depending sides, a second pivot opening, in each case side for receipt of a pivot means of each locating member, the winding housing rotatable about each respective pivot means.

4. The device as defined in claim 2 wherein each side of the winding housing includes an outwardly extending stop member received within a corresponding stop member hole within the support frame means the stop member hole and stop member limiting the rotation of the winding housing.

5. The device as defined in claim 4 wherein the stop member is on an deformable part of the winding housing and movable inwardly to avoid contact with the sides of the support frame means during assembly of the winding housing to the support frame means and thereafter movable outwardly to fit within a corresponding stop member hole.

6. The device as defined in claim 4 wherein the support frame means extends only a short distance below the stop member hole.

7. The device as defined in claim 5 wherein the web pusher member is located on the top of the winding housing.

* * * * *